June 10, 1958          W. J. ROBINSON          2,838,001
ELECTROMAGNETIC CONDUCTIVE FLUID PUMP
Filed May 8, 1957
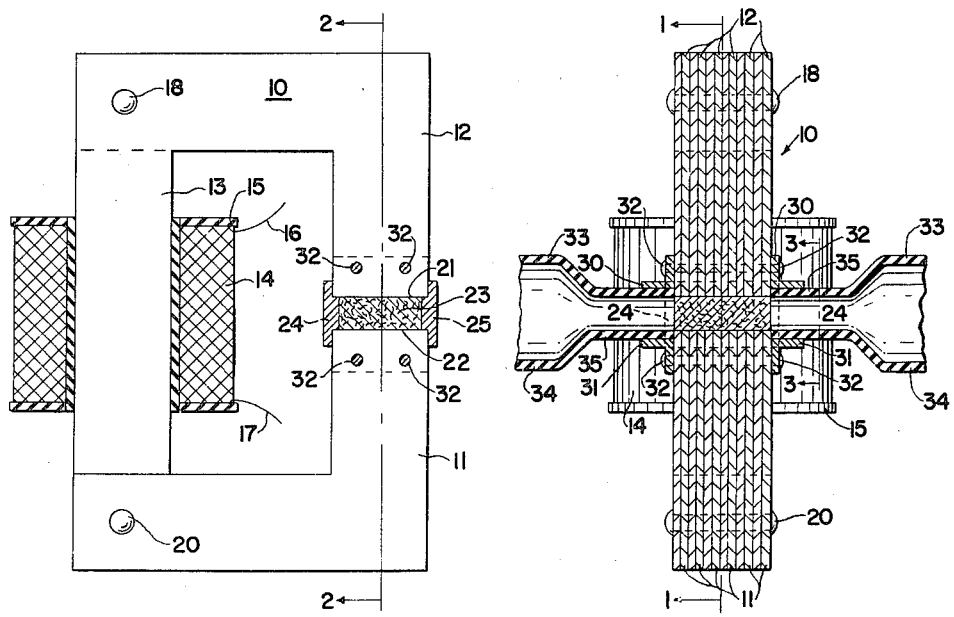
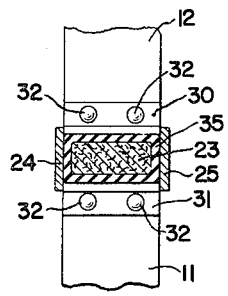
INVENTOR.
WILLIAM J. ROBINSON
BY Joseph E. Ryan
ATTORNEY United States Patent Office 2,838,001
Patented June 10, 1958

2,838,001

ELECTROMAGNETIC CONDUCTIVE FLUID PUMP

William J. Robinson, Richfield, Minn., assignor to Minneapolis-Honeywell Regulator Company, Minneapolis, Minn., a corporation of Delaware Application May 8, 1957, Serial No. 657,879

6 Claims. (Cl. 103—1)

This invention relates to electromagnetic conductive fluid pumps and more specifically relates to a pump having a porous material as its pumping channel. Electromagnetic fluid pumps have been long known in the art and are often referred to as Faraday pumps. In their usual form, they comprise a non-conductive tube filled with a conductive fluid which passes through a magnetic field. Inserted in the sides of the tube at right angles to the magnetic field are two electrodes which act to conduct a current through the magnetic field by means of the fluid in the tube. When the current and the magnetic field are in phase with each other and at substantially right angles, a force mutually perpendicular to the current and field is created in the fluid. This force acts to propel the fluid in the tube in the manner of a usual type of pump.

An object of the present invention is to disclose an electromagnetic fluid pump that has a unique configuration for the pumping channel or gap.

A further object is to disclose an electromagnetic pump that has a large opening in its magnetic structure without the normally encountered high magnetic reluctance.

These and other objects will become apparent when the following description is considered with the single sheet of drawings, wherein:

Figure 1 is a cross-sectional side view of the novel pump along lines 1—1 of Figure 2;

Figure 2 is a cross-section of a leg of the pump along lines 2—2 of Figure 1, and;

Figure 3 is a partial view of the pumping channel along lines 3—3 of Figure 2.

A C-shaped magnetic structure generally disclosed as 10 is formed of two L-shaped laminations 11 and 12. The laminations 11 and 12 are formed such that by alternately arranging the stacking of the laminations a complete C-shaped structure 10 is formed. On the center leg 13 of the structure 10 is placed a coil 14 which is wound on an insulated bobbin 15. The coil 14 has two electrical leads 16 and 17. The coil 14 is preferably pre-wound on the bobbin 15 and the bobbin 15 is inserted on the leg 13 while the laminations 11 and 12 are being assembled. Two rivets 18 and 20 are utilized to clamp the stacks of laminations 11 and 12 into a substantially solid magnetic structure.

The laminations 11 and 12 of the C-shaped structure 10 provide two opposing poles 21 and 22 which define an air gap into which is placed a porous material 23. The porous material 23 is normally of a magnetic material such as a sintered ferrite. The porous material 23 substantially fills the air gap created between poles 21 and 22 and acts to reduce the magnetic reluctance of the air gap as well as provide a channel means, as will be seen in the subsequent description. It is further understood that porous material 23 may be in any form, such as granular or solid, as long as its is pervious to the conductive fluid to be used. Placed on opposite sides of the porous material 23 are two electrodes 24 and 25. The electrodes 24 and 25 seal the sides of the pole faces 21 and 22 in a fluid tight fashion and are in direct contact with the porous material 23. The areas of contact between the electrodes 24 and 25 and the poles 21 and 22 is insulated by means of a varnish or other type of insulating sealant. Support brackets 30 and 31 are attached by means of rivets 32 to the poles 21 and 22 of the magnetic structure 10 to form a support for an insulated conduit 33. The rivets 32 not only act to hold the brackets 30 and 31 in place but also act to clamp the laminations 11 and 12 into a substantially solid mass.

The conduit 33 is formed from a material having an annular section 34 which is reduced to a rectangular cross-section 35. The rectangular cross-section 35 is inserted into the brackets 30 and 31 and are sealed therebetween by any convenient means. The sides of electrodes 24 and 25 fall adjacent the opposite sides of the rectangular section 35 and thereby form a fluid type seal at each of the opposite sides of the porous material 23 adjacent to the poles 21 and 22. It is further understood that conduit 33 could be constructed of a metallic member as long as the resistance of the metal used was high in comparison to the resistance between electrodes 24 and 25 through the porous material 23 when it contains the conductive fluid which is to be pumped. In the simplest application however, a non-metallic conduit 33 is utilized and can be constructed of a material such as plastic or glass.

With the construction described above a continuous fluid passage is established by means of conduit 33, a sealed junction formed of the brackets 30, 31, and electrodes 24 and 25. This conduit passes through the porous material 23 into the second part of the conduit 33 which has the same sealed junction as the first section described. Any conductive fluid placed in one end of conduit 33 passes through the porous material 23 between electrodes 24 and 25 out into the other end of conduit 33. If the coil 14 is energized a magnetic field will be established across the poles 21 and 22 and the conductive fluid therefore will be under the influence of this magnetic field. When a sintered ferrite is used for the porous material 23 it is understood that the magnetic field established across the poles 21 and 22 is large enough to saturate the ferrite and thereby a leakage flux exists across the voids which exist in the porous material 23. The magnetic flux existing in these voids operates in conjunction with a current which is supplied to electrodes 24 and 25, by means not shown. The current flows from one electrode to the other is at right angles to the direction of flux. This combination of flux and current creates a force in the conductive fluid which impels the conductive fluid in the porous material 23 in a direction mutually perpendicular to the direction of the current and flux. By this arrangement the electromagnetic conductive fluid pump is caused to operate.

It is further understood that the coil 14 and the laminated structure 10 could be replaced by a permanent magnet having the same C-shaped type of configuration for a direct current type pump. Also the device could be modified by utilizing a continuous tube or conduit in place of conduit 33. If a continuous conduit is utilized and is placed in the gap created by poles 21 and 22 the porous material 23 is inserted therein at a point which would coincide with the location of the above mentioned poles. Electrodes can then be inserted into the sides of the conduit or welded or soldered with a compatible solder to the outside depending on the type of construction desired. All of these constructional details are familiar to those versed in the art and will not be described in further detail here.

By the construction disclosed, the fluid passing through the porous material 23 has a large area of surface contact and this large area of surface contact allows for the flow of the necessary current between electrodes 24 and 25. This arrangement further allows for the use of a wide gap in the magnetic structure 10 but yields an electromagnetic conductive fluid pump which has the characteristic of a narrow gap type pump. Many modifications in the types of material and physical configurations could be utilized with the teachings disclosed presently, and it is understood that the applicant wishes therefore to be limited only by the scope of the appended claims.

I claim as my invention:

1. In an electromagnetic pump of the class described wherein a conductive fluid is caused to flow by an electric current and a magnetic field angularly disposed to each other and to the direction of flow of the fluid: a magnetic circuit including said magnetic field; said magnetic circuit further having an opening therethrough; conduit means having a portion thereof disposed in said opening; said portion being substantially filled with a porous material and said porous material transmitting the magnetic field across said opening; and electrode means adjacent to opposite sides of said porous material to conduct the flow of said electric current mutually perpendicular to said field and fluid flow; said current and magnetic field causing the conductive fluid to move through the porous material and thereby propel said conductive fluid in said conduit.

2. In an electromagnetic pump of the class described wherein a conductive fluid is caused to flow by an electric current and a magnetic field angularly disposed to each other and to the direction of flow of the fluid: a magnetic circuit including said magnetic field; said magnetic circuit having an opening therethrough; a porous material substantially filling said opening and transmitting the magnetic field across said opening; fluid conduction means adjacent opposite sides of said porous material to contain said conductive fluid; and electrode means adjacent to the other opposite sides of said porous material to conduct the flow of said electric current mutually perpendicular to said field and fluid flow; said current and magnetic field causing the conductive fluid to move through the porous material and to thereby propel said conductive fluid.

3. In an electromagnetic pump of the class described wherein a conductive fluid is caused to flow by an electric current and a magnetic field angularly disposed to each other and to the direction of flow of the fluid: a magnetic circuit into which is induced said magnetic field; said magnetic circuit having an opening therethrough; a porous material substantially filling said opening and transmitting the magnetic field across said opening; fluid conduction means adjacent opposite sides of said opening to contain said conductive fluid; and electrode means adjacent to the other opposite sides of said opening to conduct the flow of said electric current mutually perpendicular to said field and fluid flow; said current and magnetic field causing the conductive fluid to move through the porous material and to thereby propel said conductive fluid.

4. In an electromagnetic pump of the class described wherein a conductive fluid is caused to flow by an electric current and a magnetic field angularly disposed to each other and to the direction of flow of the fluid: a C-shaped magnetic circuit having a magnetic field induced therein; conduit means having a portion thereof disposed in the opening of said C-shaped magnetic circuit; said portion being substantially filled with a porous magnetic material and said porous material transmitting the magnetic field across said opening; and two electrodes adjacent to opposite sides of said porous material to conduct the flow of said electric current mutually perpendicular to said field and fluid flow; said current and magnetic field causing the conductive fluid to move through the porous material and thereby propel said conductive fluid in said conduit.

5. In an electromagnetic pump of the class described wherein a conductive fluid is caused to flow by an electric current and a magnetic field angularly disposed to each other and to the direction of flow of the fluid: a C-shaped magnetic circuit into which is induced said magnetic field; a porous magnetic material substantially filling the opening of said C-shaped magnetic circuit and transmitting the magnetic field across said opening; fluid conduction means adjacent opposite sides of said opening to contain said conductive fluid; and electrodes adjacent to the other opposite sides of said opening to conduct the flow of said electric current mutually perpendicular to said field and fluid flow; said current and magnetic field causing the conductive fluid to move through the porous material and to thereby propel said conductive fluid.

6. In an electromagnetic pump of the class described wherein a conductive fluid is caused to flow by an electric current and a magnetic field angularly disposed to each other and to the direction of flow of the fluid: conduit means having a portion thereof disposed in said magnetic field; said portion including a porous material; and electrode means adjacent said porous material to pass said electric current therethrough; said current and magnetic field causing the conductive fluid to move through the porous material and thereby propel said conductive fluid in said conduit means.

References Cited in the file of this patent

UNITED STATES PATENTS

| | | |
|---|---|---|
| 2,386,369 | Thompson | Oct. 9, 1945 |
| 2,655,107 | Godbold | Oct. 13, 1953 |
| 2,686,474 | Pulley | Aug. 17, 1954 |